(12) United States Patent
Bita

(10) Patent No.: US 8,234,415 B2
(45) Date of Patent: Jul. 31, 2012

(54) STORAGE DEVICE AND CONTROL UNIT

(75) Inventor: Joichi Bita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 138 days.

(21) Appl. No.: 12/502,154

(22) Filed: Jul. 13, 2009

(65) Prior Publication Data

US 2010/0011129 A1   Jan. 14, 2010

(30) Foreign Application Priority Data

Jul. 14, 2008   (JP) ................................. 2008-182773

(51) Int. Cl.
*G06F 3/00* (2006.01)
(52) U.S. Cl. ......................................................... 710/5
(58) Field of Classification Search ........................ 710/5
See application file for complete search history.

(56) References Cited

U.S. PATENT DOCUMENTS

| | | | |
|---|---|---|---|
| 6,735,672 B2 | 5/2004 | Nishikawa | |
| 7,069,353 B2 | 6/2006 | Shiraki et al. | |
| 7,100,074 B2 | 8/2006 | Watanabe et al. | |
| 7,398,330 B2 | 7/2008 | Shiraki et al. | |
| 7,685,342 B2 | 3/2010 | Shiraki et al. | |
| 2006/0112301 A1* | 5/2006 | Wong | 714/6 |
| 2007/0067562 A1* | 3/2007 | Ohsaki et al. | 711/113 |
| 2007/0248017 A1* | 10/2007 | Hinata et al. | 370/238 |

FOREIGN PATENT DOCUMENTS

| | | |
|---|---|---|
| JP | 10-49309 | 2/1998 |
| JP | 2000-099446 | 4/2000 |
| JP | 2001-100923 | 4/2001 |
| JP | 2002-175156 | 6/2002 |
| JP | 2005-149436 | 6/2005 |
| JP | 2005-322181 | 11/2005 |
| JP | 2007-323356 | 12/2007 |

OTHER PUBLICATIONS

"Japanese Notice of Grounds of Rejection", mailed by JPO and corresponding to Japanese Application No. 2008-182773 on Apr. 13, 2010, with English Translation.

* cited by examiner

*Primary Examiner* — Chun-Kuan Lee
*Assistant Examiner* — Brooke Taylor
(74) *Attorney, Agent, or Firm* — Fujitsu Patent Center

(57) ABSTRACT

A storage and a controller each include an assignment number-managing unit for managing the number of command-processing resources assigned corresponding to a command-sending/receiving pair in combination of an external device and a logical device receiving a data input/output-requiring command; and an assignment-controlling unit for assigning the data input/output-requiring command to the command-processing resource corresponding to the command-sending/receiving pair, the number of the command-processing resources being equal to or lower than the number to be assigned that is managed by the assignment number-managing unit.

12 Claims, 12 Drawing Sheets

FIG. 2

| | HOST A | | | HOST B | | | HOST C | | | HOST D | | |
|---|---|---|---|---|---|---|---|---|---|---|---|---|
| LUN0 | (a) RECEIVED COMMAND COUNT | (b) MAXIMUM Q-DEPTH | (c) QFULL COUNT | (a) RECEIVED COMMAND COUNT | (b) MAXIMUM Q-DEPTH | (c) QFULL COUNT | (a) RECEIVED COMMAND COUNT | (b) MAXIMUM Q-DEPTH | (c) QFULL COUNT | (a) RECEIVED COMMAND COUNT | (b) MAXIMUM Q-DEPTH | (c) QFULL COUNT |
| LUN1 | ... | | | ... | | | ... | | | ... | | |
| LUN2 | ... | | | ... | | | ... | | | ... | | |
| LUN3 | ... | | | ... | | | ... | | | ... | | |

21

STORAGE DEVICE AND CONTROL UNIT

CROSS-REFERENCE TO RELATED APPLICATIONS

This application is based upon and claims the benefit of priority of the prior Japanese Patent Application No. 2008-182773, filed on Jul. 14, 2008, the entire contents of which are incorporated herein by reference.

FIELD

The embodiments discussed herein are directed to a technique for providing at least one logical device for each of external devices, receiving a data input/output-requiring command for the logical device from each of the external devices, and assigning the data input/output-requiring command to a command-processing resource.

BACKGROUND

Nowadays, a storage-virtualizing technique is known such that at least one storage is virtualized to provide logical storage devices (LUN: Logical Unit Number) for respective host devices and to enable flexible system operation without physical limitation by the storage.

FIG. 11 is a schematic diagram illustrating a typical configuration of a conventional virtualized storage system. In this embodiment, the virtualized storage system 600 includes two hosts 501a and 501b, and a RAID (Redundant Arrays of Inexpensive Disks) device 605.

The RAID device 605 includes a queue 606, a controller 603, and a disk array 602. The RAID device 605 is connected to the hosts 501a and 501b through ports 601a and 601b, respectively, and writes or reads out data for HDDs 604-1 to 604-4 of the disk array 602 according to an I/O command received from the hosts 501a and 501b.

The disk array 602 includes the HDDs (four devices in FIG. 11) 604-1 to 604-4, and can treat the HDDs 604-1 to 604-4 as one logical disk in the RAID device 605.

The queue 606 is a storage area (memory) for storing various pieces of information for execution of the I/O command transferred to the RAID device 600 from the hosts 501a and 501b. For example, the queue 606 stores a return value for execution of the I/O command, various pieces of information representing progress on a process, a status, and the I/O command itself.

The queue 606 is divided into multiple queue resources having a predetermined size (for example, 256 bytes) in order to store the information for execution of the I/O command.

The controller 603 provides logical devices (LUNs) for the respective hosts 501a and 501b, and controls writing and reading out for the HDDs 604-1 to 604-4 according to the I/O command received from the hosts 501a and 501b.

The controller 603 receives the I/O commands from the hosts 501a and 501b, and then assigns queue resources of the queue 606 to the I/O commands to control the HDDs 604-1 to 604-4.

Accordingly, when the hosts 501a and 501b specify addresses for the respective LUNs provided from the RAID device 605 to send the I/O commands, the controller 603 receives the I/O commands to store (assign) the I/O commands in the queue 606 in sequence.

Then, the controller 603 writes or reads out data for the HDDs 604-1 to 604-4 according to the I/O commands to which the queue resources are assigned.

When the various pieces of information for execution of the I/O command received from the hosts 501a and 501b cannot be stored due to, for example, lack of free space of the queue 606, in other words, when the queue resources cannot be assigned; the I/O command is rejected, and is returned together with a status (QFULL) representing full space of the queue 606 toward the originating hosts 501a and 501b (QFULL response).

In the virtualized storage system 600, preferably, the I/O commands are processed among the LUNs in a proper balance, and QFULL responses are minimized.

In the hosts 501a and 501b, in order to prevent application from eternally waiting for a response from the RAID device 605, a time-out period is set for the I/O command to be sent. Furthermore, when an I/O command is not processed after this time-out period (time-out), the virtualized storage system 600 is directed to cancel a process for the I/O command, and the same I/O command is retried (time-out event).

For example, Japanese Unexamined Patent Application Publication No. 2005-149436 discloses a technique for adjusting the logical size of a queue in order to minimize the occurrence of the time-out event and the QFULL event described above.

FIGS. 12(a) to (c) illustrate a technique for adjusting the logical size of the queue in a conventional virtualized storage system. FIG. 12(a) illustrates the logical size of the queue to be assigned to each queue before the adjustment. FIG. 12(b) illustrates that the LUN having a high rate of occurrence of a QFULL has a logical size increased in FIG. 12(a). FIG. 12(c) illustrates that the I/O commands for other LUNs are further received in FIG. 12(b).

In these drawings, symbols a1 to a7 denote identification information for specifying the respective LUNs. For example, in the state illustrated in FIG. 12(a), the host 501a sends I/O commands to the LUNs# a1, a2, a3, and a4 in the RAID device 605, and the queues having logical sizes are assigned to the respective I/O commands.

The technique disclosed in Japanese Unexamined Patent Application Publication No. 2005-149436 increases the logical sizes of the queues assigned to the LUNs# a1 and a3 as illustrated in FIG. 12(b) in the case of, for example, an increase in the QFULL rates of the LUNs# a1 and a3 in the state as shown in FIG. 12(a).

This patent document also discloses a technique for decreasing the logical sizes of the queues in the case of time-out rates exceeding a threshold value in addition to the technique for increasing the logical sizes of the queues in the case of excess of the QFULL rates as described above.

Since queue resources are finite in a virtualized storage system, preferably, these queue resources are efficiently used.

However, since the LUN of the queue resources exceeding the threshold value cannot be unlimitedly increased in the conventional virtualized storage system as described above, occurrence of the QFULL events cannot be reduced.

For example, as illustrated in FIG. 12(c), the I/O commands for the LUNs# a5, a6, and a7 are further received from the host 501a in the state illustrated in FIG. 12(b) to fill the queues. After this, even if the QFULL rate of the LUN# a2 is increased, queues assigned to the LUN# a2 cannot be increased any more.

Time-out also occurs due to temporary hardware abnormality (for example, a medium error or a malfunction of a disk) of the HDDs 604-1 to 604-4 in the RAID device 605. Since occurrence of time-out due to such a temporary cause decreases the logical sizes of the queues in the conventional technique for decreasing the logical sizes of the queues in the case of the time-out rates exceeding the threshold value, the assigned queue resources are still decreased not to enable the efficient use of the queue resources even after, for example, a recovery function of the RAID device 605 fixes the hardware abnormality.

SUMMARY

In accordance with the present invention, a storage capable of communicating with external devices, providing at least one logical device for each of the external devices, receiving a data input/output-requiring command for the logical device from each of the external devices, and assigning the data input/output-requiring command to a command-processing resource to perform the command, includes: an assignment number-managing unit for managing the number of the command-processing resources assigned corresponding to a command-sending/receiving pair in combination of the external device and the logical device receiving the data input/output-requiring command; and an assignment-controlling unit for assigning the data input/output-requiring command to the command-processing resource corresponding to the command-sending/receiving pair, the number of the command-processing resources being equal to or lower than the number to be assigned that is managed by the assignment number-managing unit.

In accordance with the present invention, a controller capable of communicating with external devices, providing at least one logical device for each of the external devices, receiving a data input/output-requiring command for the logical device from each of the external devices, and assigning the data input/output-requiring command to a command-processing resource to perform the command, includes: an assignment number-managing unit for managing the number of the command-processing resources assigned corresponding to a command-sending/receiving pair in combination of the external device and the logical device receiving the data input/output-requiring command; and an assignment-controlling unit for assigning the data input/output-requiring command to the command-processing resource corresponding to the command-sending/receiving pair, the number of the command-processing resources being equal to or lower than the number to be assigned that is managed by the assignment number-managing unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates exemplary implementation information in the storage system in accordance with an embodiment of the present invention.

DESCRIPTION OF EMBODIMENTS

Hereinafter, exemplary embodiments will be described with reference to the accompanying drawings.

Figure 1:
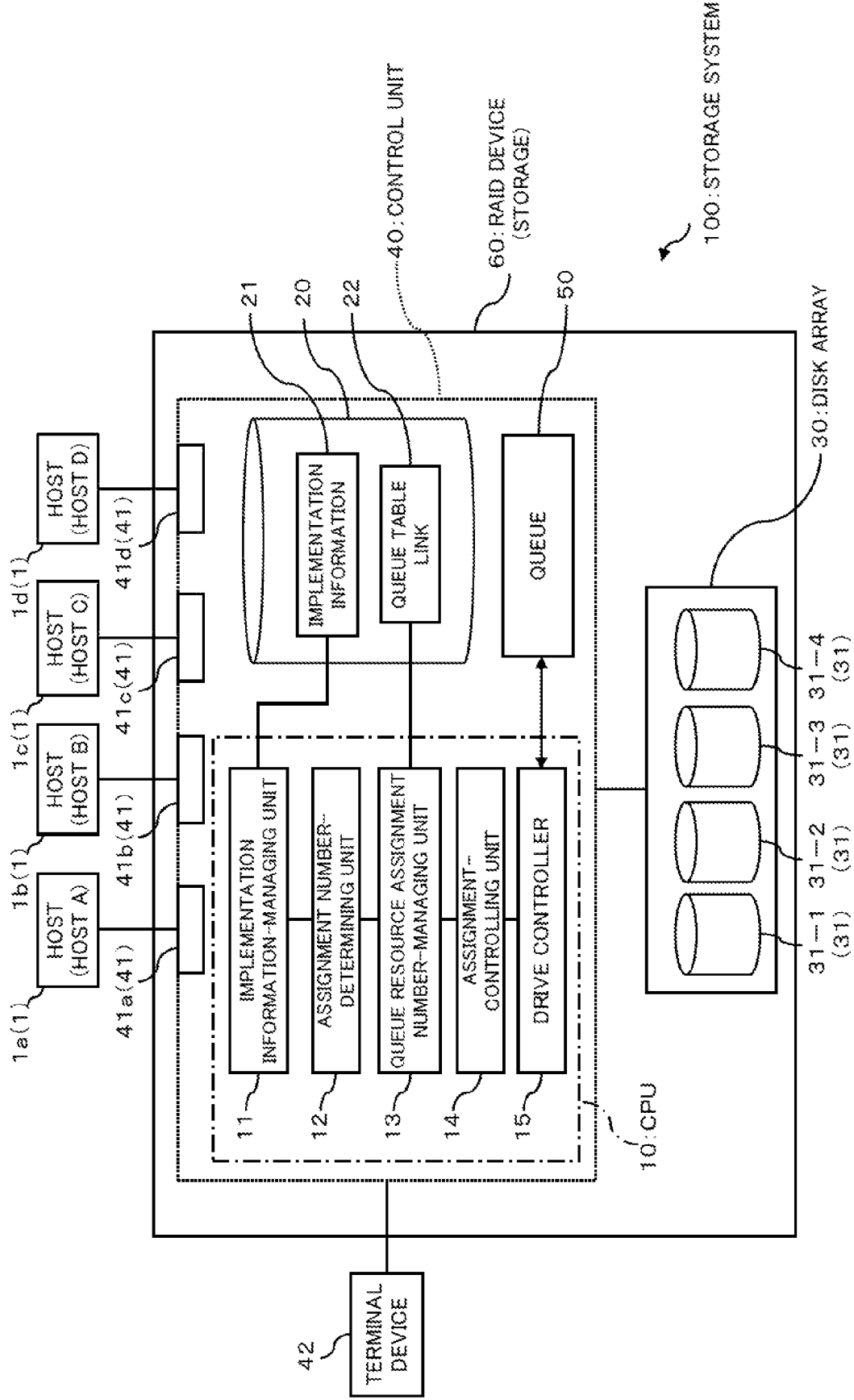
FIG. 1 is a schematic diagram illustrating a configuration of a storage system in accordance with an embodiment of the present invention.

FIG. 1 is a schematic diagram illustrating a configuration of a storage system in accordance with an embodiment of the present invention.

The storage system 100 in accordance with this embodiment includes hosts (external devices, four hosts in FIG. 1) 1*a*, 1*b*, 1*c*, and 1*d*, a terminal device 42, and a RAID device (storage device) 60.

The RAID device 60 is capable of communicating with the hosts 1*a*, 1*b*, 1*c*, and 1*d* through communication ports 41*a*, 41*b*, 41*c*, and 41*d*, respectively, and provides at least one logical device (LUN: Logical Unit Number) for each of the hosts 1*a*, 1*b*, 1*c*, and 1*d*. The RAID device 60 includes a control unit 40 and a disk array 30.

Hereinafter, the symbols 1*a*, 1*b*, 1*c*, and 1*d* indicate one specific host among the hosts, while a symbol 1 indicates any of the hosts.

The disk array 30 includes memory units (four devices in FIG. 1) 31-1 to 31-4, and can treat the memory units 31-1 to 31-4 as one logical memory unit.

Various memory units such as an HDD (Hard disk drive) and a semiconductor memory unit can be used for the memory units 31-1 to 31-4. In this embodiment, HDDs are exemplarily used for the memory units 31-1 to 31-4, which may be hereinafter represented as HDDs 31-1 to 31-4, respectively.

Hereinafter, the symbols 31-1, 31-2, 31-3, and 31-4 indicate one specific memory unit (HDD) among the memory units (HDDs), while a symbol 31 indicates any of the memory units (HDDs).

Hereinafter, the symbols 41*a*, 41*b*, 41*c*, and 41*d* indicate one specific communication port among the communication ports, while a symbol 41 indicates any of the communication ports.

The control unit 40 controls functions of the RAID device 60, provides at least one logical device (LUN) for each of the hosts 1a, 1b, 1c, and 1d, and controls writing and reading out for the HDDs 31-1 to 31-4 in the disk array 30 according to an I/O command (data input/output-requiring command) received from the hosts 1a, 1b, 1c, and 1d.

The control unit 40 receives the I/O commands from the hosts 1, and then assigns queue resources described below to the I/O commands to control the HDDs 31.

Accordingly, in the storage system 100, when the hosts 1 specify addresses for the respective LUNs provided from the RAID device 60 to send the I/O commands, the control unit 40 receives the I/O commands to store the I/O commands in the queue resources in sequence, and writes or reads out data for the HDD 31 according to the I/O command.

When various pieces of information for execution of the I/O command received from the host 1 cannot be stored due to, for example, lack of the queue resource, the control unit 40 rejects the I/O command and returns a status (QFULL) representing the lack of the queue resource that can be assigned toward the originating host 1 (QFULL response).

As illustrated in FIG. 1, the control unit 40 includes a CPU 10, a storage unit 20, and a queue 50.

The queue 50 is a storage area (memory) for storing various pieces of information for execution of the I/O command transferred to the RAID device 60 from the host 1.

The queue 50 is divided into multiple queue resources (unit queues or command-processing resources) having a predetermined size (for example, 256 byte) in order to store the various pieces of information for execution of the I/O command.

For example, the queue 50 stores a return value for execution of the I/O command, information representing progress on a process (for example, an execution location and a status), and the I/O command itself. Such information is stored in each queue resource.

The storage unit 20 stores information for various processes executed by the CPU 10 described below in the control unit 40, and is implemented by, for example, a semiconductor storage device or an HDD.

In the storage system 100, the storage unit 20 stores implementation information 21 and a queue table link 22.

The implementation information 21 relates to the I/O command processed (executed) in the storage system 100, and includes, for example, the count of received commands, a maximum queue-depth, and a QFULL count.

Now, the count of the received commands represents the count of the I/O commands received from the host 1 per unit time, while the maximum queue-depth represents the number of the I/O commands concurrently processed per unit time (maximum concurrently executed-command count). The QFULL count represents the count of the QFULL responses to the host 1 per unit time.

Since the number of the received commands, the maximum queue-depth, and the QFULL number can be acquired by various known techniques, the description of such techniques will be omitted.

The unit time for the number of the received commands, the maximum queue-depth, and the QFULL number can be arbitrarily set (for example, one minute, 30 seconds, or 15 seconds). For example, the unit time is arbitrarily set and changed by a user through the terminal device 42 described below.

The same unit time may be used for the number of the received commands, the maximum queue-depth, and the QFULL number. Alternatively, different unit time may be used for at least one of them.

FIG. 2 illustrates exemplary implementation information 21 in the storage system 100 in accordance with an embodiment of the present invention.

As illustrated in FIG. 2, in the storage system 100, implementation information including the number of the received commands, the maximum queue-depth, and the QFULL number is generated and managed for every combination of the host 1 and the LUN (command-sending/receiving pair).

In FIG. 2, as a matter of convenience, the number of the received commands, the maximum queue-depth, and the QFULL number are illustrated for only the command-sending/receiving pair relating to LUN0, and are omitted for the command-sending/receiving pairs relating to LUN1 to LUN3.

In the embodiment of FIG. 2, the implementation information 21 is illustrated in a matrix including the LUNs and the hosts 1 as a matter of convenience. However, this embodiment is not restricted to this. Various modifications may be made to the embodiment without departing from the spirit of the present invention.

The queue table link 22 manages the number of the queue resources assigned to each combination of the host 1 and the LUN (command-sending/receiving pair).

Figure 3:
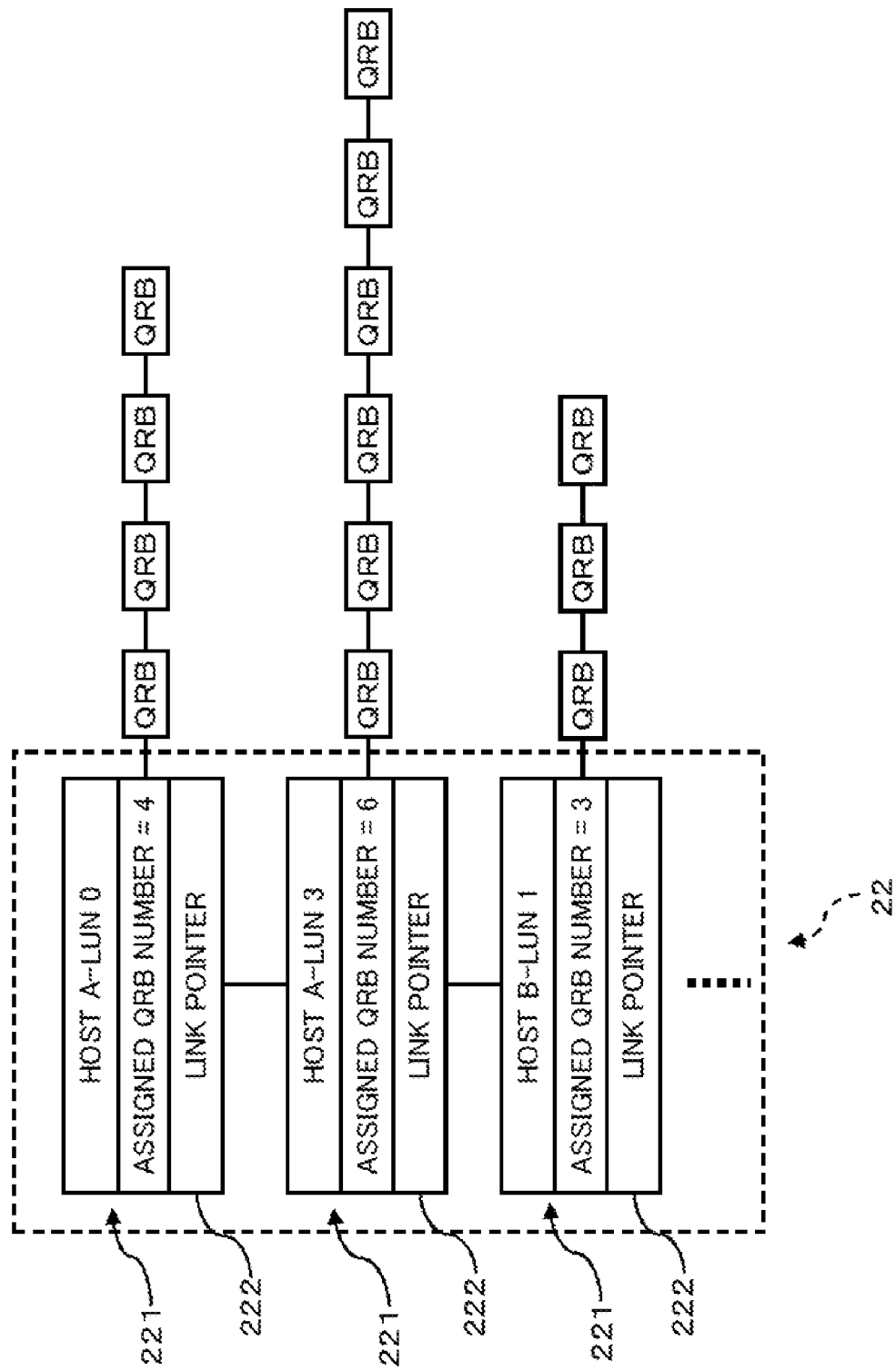
FIG. 3 illustrates the exemplary queue table link in the storage system in accordance with an embodiment of the present invention.

FIG. 3 illustrates the exemplary queue table link 22 in the storage system 100 in accordance with an embodiment of the present invention.

As illustrated in FIG. 3, the queue table link 22 includes queue tables 221 associated (linked) with one another by link pointers 222. Each queue table 221 includes a combination of the host 1 and the LUN (command-sending/receiving pair) associated with the number of the queue resources (assigned QRB number) assigned to the command-sending/receiving pair.

The link pointer 222 is information (pointer) representing a storing location (for example, an address) for the next queue table 221 in the storage unit 20, and can inform, for example, a queue resource assignment number-managing unit 13 of the storing location for another queue table 221.

In the storage system 100, k queue resources are managed as one unit, where k represents the number of the queue resources. For example, in this embodiment, four (k=4) queue resources are treated as 1QRB (Queue Resource Block). The number of the queue resources to be assigned is managed by the number of the QRBs (QRB number).

For example, as illustrated in FIG. 3, the six QRBs are assigned to the command-sending/receiving pair [HOST A-LUN3] (assigned QRB number=6). Therefore, the 24 (4×6=24) queue resources (unit queues) are assigned to the command-sending/receiving pair [HOST A-LUN3].

Hereinafter, the number of the queue resources configuring one QRB may be referred to as a QRB configuration number.

The QRB configuration number (k) can be arbitrarily set or changed, for example, by a user through the terminal device 42 described below.

Hereinafter, the number of the multiple QRBs may be prefixed to "QRB". For example, 6QRB represents six QRBs.

In the example of FIG. 3, as a matter of convenience, the QRBs equal to the assigned QRB numbers are aligned so as to be adjacent to the respective queue tables 221 in the queue table link 22.

A CPU (Central Processing Unit) 10 executes an OS (Operating System) and a program stored in the storage unit 20 or a storage device not illustrated to process various calculations and controls, and implements various functions. In the storage system 100, the CPU 10 executes a queue resource assignment-managing program stored in, for example, the storage unit 20 to function as an implementation information-managing unit 11, an assignment number-determining unit 12, a queue resource assignment number-managing unit 13, an assignment-controlling unit 14, and a drive controller 15.

The implementation information-managing unit 11 generates the implementation information 21 to store the implementation information 21 in the storage unit 20, and manages the implementation information 21, so as to collect the number of the received commands, the maximum queue-depth, and the QFULL number based on the I/O command received from the host 1 or on a process based on the I/O command by, for example, the drive controller 15 (described below in detail) and store the number of the received commands, the maximum queue-depth, and the QFULL number in the implementation information 21 to manage and update the implementation information 21.

The assignment number-determining unit 12 determines the number of the queue resources (command-processing resources) to be assigned to each command-sending/receiving pair (LUN) so as to determine the number of the queue resources to be assigned (assigned QRB number) to each command-sending/receiving pair based on the implementation information 21.

In the storage system 100, the assignment number-determining unit 12 determines the number of the resources to be assigned to the command-sending/receiving pair in a QRB unit.

In the storage system 100, the number of the queue resources to be assigned to one communication port 41 (the number of the queue resources per port) is limited. For example, the total number of the queue resources to be concurrently assigned to one communication port 41 (in other words one host 1) is set so as not to exceed a limit value (for example, 1024 in other words 256QRB).

The limit value for the number of the queue resources per port can be arbitrarily set or changed, for example, by a user through the terminal device 42 described below.

In the storage system 100, the number of the queue resources to be assigned to one LUN (the number of the queue resources per LUN) is also limited. For example, the total number of the queue resources to be concurrently assigned to one LUN is set so as not to exceed a limit value (for example, 1024 in other words 256QRB).

The limit value for the number of the queue resources per LUN can be arbitrarily set or changed, for example, by a user through the terminal device 42 described below.

In the storage system 100, the assignment number-determining unit 12 increases the queue resources assigned to the LUN (command-sending/receiving pair) receiving the many I/O commands, and decreases the queue resources assigned to the LUN (command-sending/receiving pair) receiving the few I/O commands.

In the storage system 100, the assignment number-determining unit 12 equally assigns the queue resources to the LUNs (command-sending/receiving pairs) in which the QFULL response occurs.

In the storage system 100, in response to the I/O command first sent from the host 1 to the LUN, the control unit 40 executes this command or returns a BUSY response, so as not to return the QFULL response in response to this first I/O command.

The reason for this is that some hosts 1 are configured so as not to send (so as to restrain) the I/O commands toward a LUN once receiving the QFULL response in response to the I/O commands toward the LUN from the RAID device 60.

Even such hosts 1 generally retry the I/O commands in response to the BUSY response for the I/O commands from the RAID device, which has a small effect.

Figure 4:
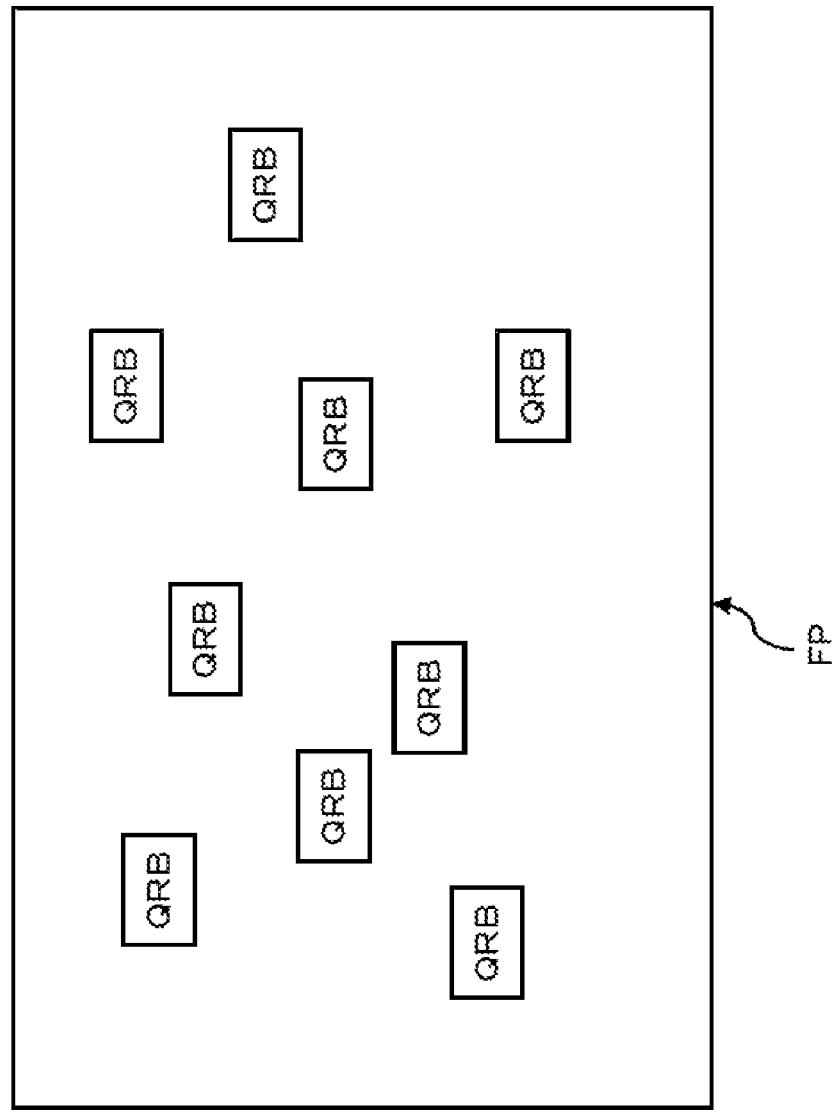
FIG. 4 is a schematic diagram illustrating the QRBs stored in the free pool of the storage system in accordance with an embodiment of the present invention.

In the storage system 100, the queue resource not assigned (unassigned) to, for example, the I/O command is described with a free pool FP (empty resource area, see FIG. 4). Hereinafter, the unassigned queue resource (QRB) is represented by "being located in the free pool FP" or "being stored in the free pool FP".

FIG. 4 is a schematic diagram illustrating the QRBs stored in the free pool FP of the storage system 100 in accordance with an embodiment of the present invention.

In this embodiment, nine unassigned QRBs (36 unassigned queue resources) are stored in the free pool FP.

The free pool FP is a virtual area (space or memory area). For example, setting of identification information (for example, a flag) that represents non-assignment to an unassigned queue resource can treat the queue resource having the identification information as an unassigned queue resource, in other words, a queue resource located in the free pool FP.

In the storage system 100, unassigned queue resources are stored in the free pool FP in a QRB unit.

The assignment number-determining unit 12 refers to the free pool FP to recognize the number of the unassigned QRBs and to assign the unassigned QRB to the command-sending/receiving pair. For example, information (identification information) about the command-sending/receiving pair to which a QRB is assigned is set to the QRB. Furthermore, the identification information (for example, a flag) representing non-assignment is deleted from the QRB, which is thereby deleted (removed) from the free pool FP.

The assignment number-determining unit 12 periodically readjusts (balances) the assigned QRB numbers (queue resources) among the command-sending/receiving pairs. Techniques for determining the assigned QRB number and balancing the queue resources by the assignment number-determining unit 12 will be described below.

The queue resource assignment number-managing unit (assignment number-managing unit) 13 manages the number of the queue resources to be assigned (assigned QRB number) to each command-sending/receiving pair, and generates/manages the queue table link 22 (the queue table 221) based on the assigned QRB number determined by the assignment number-determining unit 12.

Specifically, the queue resource assignment number-managing unit 13 relates the assigned QRB number determined by the assignment number-determining unit 12 to the command-sending/receiving pair to generate the queue table 221, and links (associates) the queue tables 221 relating to the respective command-sending/receiving pairs with one another by the link pointers 222 to generate the queue table link 22. The queue table link 22 generated by the queue resource assignment number-managing unit 13 is stored in the storage unit 20.

Every time the assignment number-determining unit 12 determines or changes the assigned QRB number for the command-sending/receiving pair as described below, the queue resource assignment number-managing unit 13 reflects the changed assigned QRB number in the queue table link 22.

The assignment-controlling unit 14 assigns, for example, the I/O command to the queue resource, and assigns, for example, the I/O command to the queue resources having an upper limit value equal to the assigned QRB number managed by the queue resource assignment number-managing unit 13.

Accordingly, the assignment-controlling unit 14 assigns the various pieces of information for execution of the I/O command (for example, the return value, the information representing progress on a process, the status, and the I/O command itself) relating to the command-sending/receiving pair to the queue resources having an upper limit value equal to the number {(assigned QRB number)×(QRB configuration number (k))} corresponding to an assignment number (assigned QRB number) managed by the queue resource assignment number-managing unit 13 to store the various pieces of information for the execution in the queue 50.

Hereinafter, as a matter of convenience, assignment of the I/O command or the various pieces of information for execution of the I/O command to the queue resource is merely referred to as assignment of the I/O command.

Since the assignment-controlling unit 14 can assign, for example, the I/O command to the queue resource by various known techniques, the description of such techniques will be omitted.

The drive controller 15 processes or executes the I/O command assigned to the queue resource by the assignment-controlling unit 14 to control the HDDs 31-1 to 31-4 in the disk array 30, and writes or reads out data.

The drive controller 15 stores data in the HDDs 31-1 to 31-4 as actual physical disks according to a predetermined data format of a logical device provided for the host 1.

Since the drive controller 15 can write or read out data for the HDDs 31-1 to 31-4 in the disk array 30 by various known techniques, the description of such techniques will be omitted.

The terminal device 42 variously sets or controls the RAID device 60. The terminal device 42 includes a display and an input device (for example, a keyboard or a mouse) not illustrated, can communicate with the RAID device 60, and can variously sets or controls the RAID device 60 by input operation of a user from the terminal device 42.

For example, the user can arbitrarily set the unit time, the QRB configuration number (k), and limiting values for the numbers of the queue resources per port and per LUN for determining the count of the received commands, the maximum queue-depth, and the QFULL count through the terminal device 42.

The terminal device 42 can also set unit time for measuring the implementation information 21. The user can arbitrarily set this unit time through the terminal device 42.

In the storage system 100 in accordance with the above-described embodiments of the present invention, techniques for distributing the queue resources by the assignment number-determining unit 12 is described for each state.

(a) Initial State

In the storage system 100, for example, a state before a specific job starts from the host 1 such as power-on or reset is referred to as an initial state.

In the storage system 100, any queue resources are not assigned (free state) to the command-sending/receiving pairs in the initial state. In other words, all the QRBs (for example, 256QRB) are located in the free pool FP.

In the initial state, the implementation information-managing unit 11 starts to acquire the implementation information 21 (the count of response commands, the maximum queue-depth, and the QFULL count per predetermined time).

(b) During a Process for the First I/O Command

For example, in the case of first transmission of an I/O command from the host 1 to the LUN, such as start of a job from the host 1, the assignment number-determining unit 12 first refers to the free pool FP, and acquires and sets the predetermined number (initial assignment number, for example, eight) of QRBs from the free pool FP for the command-sending/receiving pair in combination of the originating host 1 and the destination LUN for the I/O command if there are QRBs in the free pool FP, in other words, unassigned RQBs.

Accordingly, if the number of the unassigned QRBs in the free pool FP suffices the initially assigned number, the assignment number-determining unit 12 acquires an initially assigned number of QRBs from the free pool FP to assign the QRBs.

Figure 5:
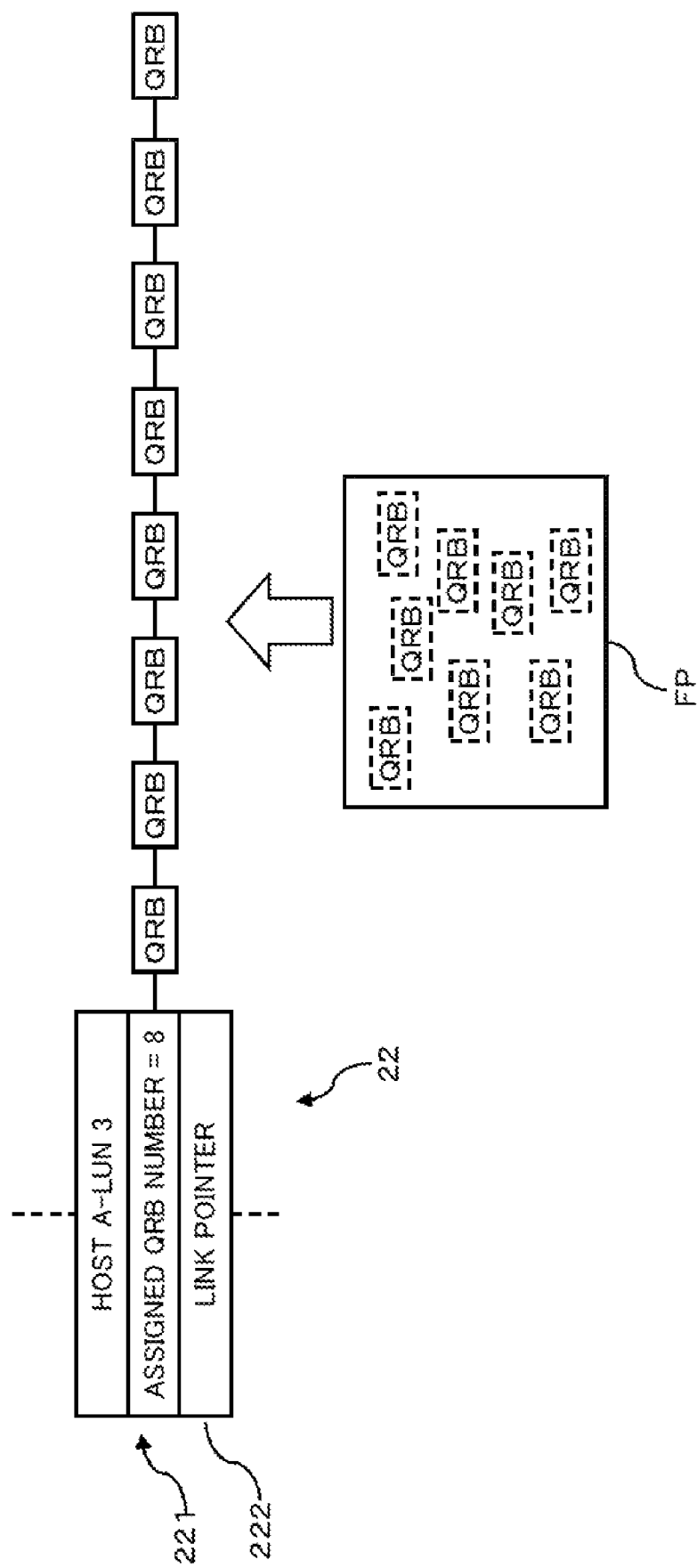
FIG. 5 illustrates the exemplary queue table of the command-sending/receiving pair to which the assignment number-determining unit sets the initially assigned number of QRBs in the storage system in accordance with an embodiment of the present invention.

FIG. 5 illustrates the exemplary queue table of the command-sending/receiving pair to which the assignment number-determining unit 12 sets the initially assigned number of QRBs in the storage system 100 in accordance with an embodiment of the present invention.

In the embodiment of FIG. 5, the eight QRBs are assigned to the command-sending/receiving pair [HOST A-LUN3]. Due to this assignment of the QRBs, the same number of unassigned QRBs as that of the assigned QRBs are deleted from the free pool FP.

When the initially assigned number of QRBs cannot be assigned to the command-sending/receiving pair since the unassigned QRBs in the free pool FP do not suffice assignment to the I/O command, the assignment number-determining unit 12 collects and acquires redundant QRBs from command-sending/receiving pairs other than the command-sending/receiving pair [HOST A-LUN3] to be set with this assignment of the QRBs.

Figure 6:
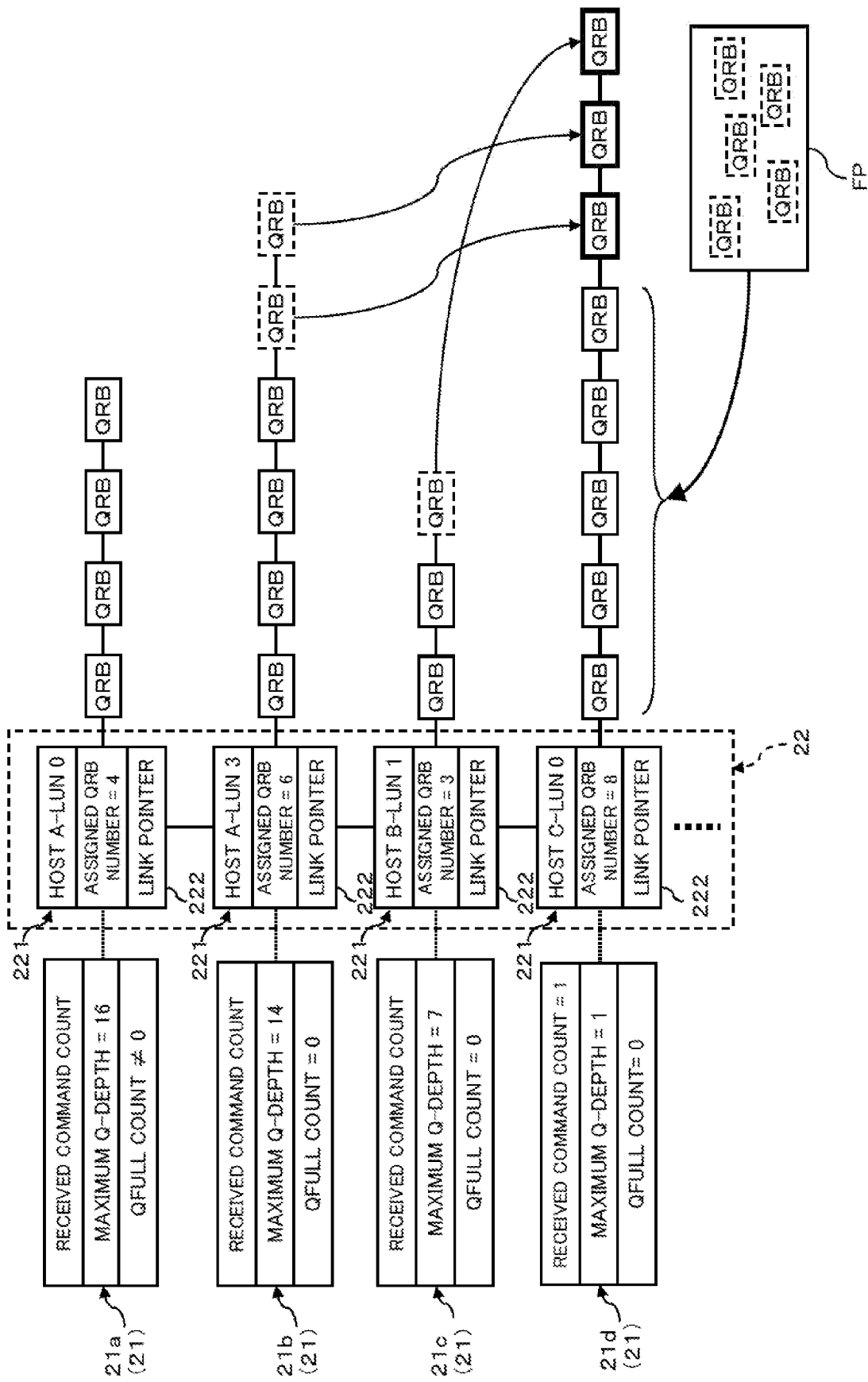
FIG. 6 illustrates a technique for assigning the queue resources by the assignment number-determining unit in the storage system in accordance with an embodiment of the present invention.

FIG. 6 illustrates a technique for assigning the queue resources by the assignment number-determining unit 12 in the storage system 100 in accordance with an embodiment of the present invention, the technique acquiring redundant QRBs from other command-sending/receiving pairs when the unassigned QRBs in the free pool FP do not suffice assignment of the initial assignment number of the QRBs.

In the embodiment of FIG. 6, when four QRBs are assigned to the command-sending/receiving pair [HOST A-LUN0], six QRBs to the command-sending/receiving pair [HOST A-LUN3], and three QRBs to the command-sending/receiving pair [HOST B-LUN1], and five unassigned QRBs are located in the free pool FP, the host C newly sends the first I/O command to LUN0.

In the example of FIG. 6, as a matter of convenience, the implementation information (the number of the received commands, the maximum queue-depth, and the QFULL number) 21a, 21b, 21c, and 21d corresponding to the command-sending/receiving pairs is adjacent to the respective queue tables 221.

In the state of FIG. 6, the assignment number-determining unit 12 will assign the QRBs for this I/O command newly sent from the host C to LUN0 to the command-sending/receiving pair [HOST C-LUN0] (hereinafter, a command-sending/receiving pair to which the number of the QRBs is assigned is referred to as a target command-sending/receiving pair). However, the initial assignment number equal to eight of the QRBs cannot be assigned to the target command-sending/receiving pair [HOST C-LUN0] by only five unassigned QRBs in the free pool FP.

Therefore, the assignment number-determining unit 12 checks whether or not redundant QRBs exist among the QRBs assigned in each of the command-sending/receiving pairs [HOST A-LUN0], [HOST A-LUN3], and [HOST B-LUN1] other than the target command-sending/receiving pair [HOST C-LUN0].

Now, the number of the redundant QRBs (redundant QRB number) is obtained by subtracting the number of the QRBs (required QRB number) sufficing (corresponding to) the queue resources equal to the maximum queue-depth from the number of the QRBs assigned to the command-sending/receiving pair, and can be derived from the following expression.

(Redundant QRB number)=(assigned QRB number)−(required QRB number)

The number of the QRBs (required QRB number) sufficing the queue resources equal to the maximum queue-depth is a minimum number of QRBs including (sufficing) the queue resources equal to the maximum queue-depth, and is specifically an integer obtained by rounding out a fractional figure or decimal part of a quotient of the maximum queue-depth divided by the QRB configuration number (n).

For example, in the embodiment illustrated in FIG. 6, the maximum queue-depth of the command-sending/receiving pair [HOST A-LUN3] is equal to 14 (see the implementation information 21*b*). In the case of the QRB configuration number equal to "4" (n=4), the number of QRBs sufficing 14 queue resources equal to the maximum queue-depth "14" is equal to "4" {(required QRB number)=4}.

Therefore, the redundant QRB number of the command-sending/receiving pair [HOST A-LUN3] is obtained by (assigned QRB number "6")−(required QRB number "4")=2.

Similarly, in the embodiment in FIG. 6, the redundant QRB number of the command-sending/receiving pair [HOST A-LUN0] is equal to "0", and the redundant QRB number of the command-sending/receiving pair [HOST B-LUN1] to "1".

The assignment number-determining unit 12 adds (assigns) the redundant QRB number "2" of the command-sending/receiving pair [HOST A-LUN3] and the redundant QRB number "1" of the command-sending/receiving pair [HOST B-LUN1] to an unassigned QRB number "5" assignable to the command-sending/receiving pair [HOST C-LUN0] to assign eight QRBs equal to the initially assigned number to the command-sending/receiving pair [HOST C-LUN0].

Then, the numbers of the redundant QRBs (redundant QRB numbers) are subtracted from the respective assigned QRB numbers of the command-sending/receiving pairs [HOST A-LUN3] and [HOST B-LUN1].

Specifically, in the embodiment in FIG. 6, the redundant QRB number "2" of the command-sending/receiving pair [HOST A-LUN3] is assigned (shifted) to the command-sending/receiving pair [HOST C-LUN0] to decrease the assigned QRB number of the command-sending/receiving pair [HOST A-LUN3] from "6" to "4" Similarly, the redundant QRB number "1" of the command-sending/receiving pair [HOST B-LUN1] is also assigned (shifted) to the command-sending/receiving pair [HOST C-LUN0] to decrease the assigned QRB number of the command-sending/receiving pair [HOST B-LUN1] from "3" to "2".

Hereinafter, for assignment of QRBs to a target command-sending/receiving pair, decreasing the assigned QRB number of another command-sending/receiving pair to add the decreased number to the assigned QRB number of the target command-sending/receiving pair may be referred to as acquiring QRBs from a command-sending/receiving pair.

In other words, for assignment of QRBs to a target command-sending/receiving pair, the assignment number-determining unit 12 acquires redundant QRBs from another command-sending/receiving pair, and assigns the acquired redundant QRBs (adds the acquired redundant QRBs to the assigned QRB number) to the target command-sending/receiving pair.

In the storage system 100, when the assignment number-determining unit 12 assigns the redundant QRBs acquired from another command-sending/receiving pair to a target command-sending/receiving pair, the number of the assigned redundant QRBs is subtracted from the assigned QRB number of the other command-sending/receiving pair to maintain the constant total number (limiting value) of queue resources (QRB) per communication port 41 (namely, host 1).

Even after a decrease in assigned QRB numbers of the command-sending/receiving pairs [HOST A-LUN3] or [HOST B-LUN1], these assigned QRB numbers suffice the number of the queue resources equal to the respective maximum queue-depths. Therefore, the QFULL response is unlikely to occur in these command-sending/receiving pairs, which maintains high reliability of the storage system 100.

The assignment number-determining unit 12 acquires redundant QRBs in sequence by, for example, a round-robin technique from command-sending/receiving pairs such that {[the number of assigned queues((assigned QRB number)× (QRB configuration number (k=4 in this embodiment)))]−(maximum queue-depth)}(redundant queue resource number) is equal to or more than the QRB configuration number, thereby assigning the QRBs sufficing the initially assigned number to a command-sending/receiving pair such that unassigned QRBs in the free pool FP cannot suffice its initially assigned number.

When the initially assigned number cannot be sufficed even by assigning redundant QRBs acquired from other command-sending/receiving pairs by, for example, a round-robin technique as described above, the assignment number-determining unit 12 determines the number of the assigned QRBs to be the assigned QRB number of the target command-sending/receiving pair.

For example, when only three redundant QRBs are acquired from other command-sending/receiving pairs in the case of only three unassigned QRBs in the free pool FP, the assignment number-determining unit 12 assigns 6QRB {(assigned QRB number)=6} to the target command-sending/receiving pair.

Since queue resources are assigned to a command-sending/receiving pair in a QRB unit in the storage system 100, assignment of at least one QRB can suffice processes for at least k I/O commands. Therefore, minimum I/O commands can be executed by this QRB configuration number.

The value of the QRB configuration number (k) can be increased to reduce a rate of occurrence of a QFULL. In other words, this QRB configuration number (k) can ensure minimum operation relating to a QFULL in the storage system 100.

In the case of neither unassigned QRBs in the free pool FP nor redundant QRBs that cannot be acquired from another command-sending/receiving pair for determination of the assigned QRB number, the assignment number-determining unit 12 acquires one QRB from a command-sending/receiving pair having an assigned QRB number equal to or more than "2" among other command-sending/receiving pairs in which any QFULL events do not occur {(QFULL number)=0} in a predetermined period with reference to the implementation information 21 to assign the acquired QRB to the target command-sending/receiving pair.

Figure 7:
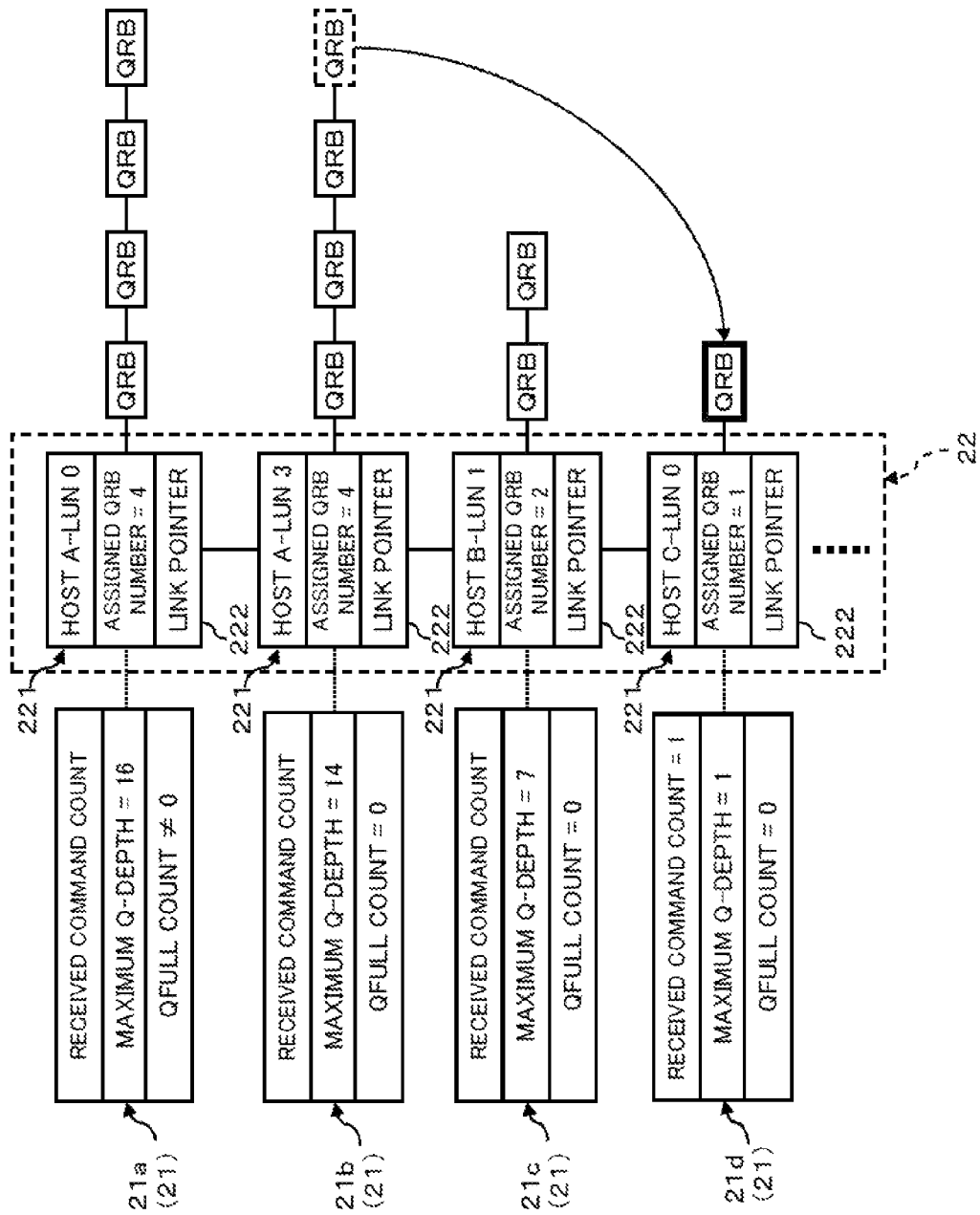
FIG. 7 illustrates a technique for assigning the queue resources by the assignment number-determining unit in the storage system in accordance with an embodiment of the present invention.

FIG. 7 illustrates a technique for assigning the queue resources by the assignment number-determining unit 12 in the storage system 100 in accordance with an embodiment of the present invention, the technique acquiring QRBs from other command-sending/receiving pairs when no unassigned QRB exists in the free pool FP and when redundant QRBs cannot be acquired from the other command-sending/receiving pairs.

In the embodiment illustrated in FIG. 7, in each of the command-sending/receiving pairs [HOST A-LUN3] and [HOST B-LUN1], any QFULL events do not occur, and the assigned QRB number equal to or more than two is included.

The assignment number-determining unit 12 selects one command-sending/receiving pair ([HOST A-LUN3] in the embodiment in FIG. 7) from the command-sending/receiving pairs [HOST A-LUN3] and [HOST B-LUN1] by a round-robin technique, and then acquires one QRB from the selected command-sending/receiving pair to assign the acquired QRB to the target command-sending/receiving pair [HOST C-LUN0].

Since queue resources are assigned to a command-sending/receiving pair in a QRB unit in the storage system 100 as described above, assignment of at least one QRB can suffice processes for at least k I/O commands.

In this embodiment, a QRB is acquired from one command-sending/receiving pair selected from command-sending/receiving pairs having an assigned QRB number equal to or more than "2" without any QFULL events for a predetermined period by a round-robin technique. However, this embodiment is not restricted to this. For example, one command-sending/receiving pair may be selected from these command-sending/receiving pairs in a random manner. Thus, various modifications can be made to this embodiment without departing from the spirit and scope of the invention.

When no QRB is acquired by any of the above-described techniques and is assigned to a target command-sending/receiving pair, the assignment number-determining unit 12 returns a BUSY response to the corresponding host 1.

At least one QRB may be preliminarily reserved for the case of acquisition of no QRB. Thus, various modifications can be made to this embodiment without departing from the spirit and scope of the invention.

(c) During Occurrence of a QFULL

In the case of less than 32 queue resources {(assigned QRB number)=8} assigned to the command-sending/receiving pair (target command-sending/receiving pair) corresponding to a host 1 sending an I/O command to a LUN in the storage system 100, when unassigned QRBs exist in the free pool FP, the assignment number-determining unit 12 acquires the unassigned QRBs from the free pool FP to assign the acquired unassigned QRBs to the target command-sending/receiving pair.

In the case of no unassigned QRB in the free pool FP, a QFULL response is returned to the host 1.

On the other hand, in the case of at least 32 queue resources {(assigned QRB number)=8} assigned to the command-sending/receiving pair (target command-sending/receiving pair), unassigned QRBs are not acquired from the free pool FP while a QFULL response is returned, even when the unassigned QRBs exist in the free pool FP.

(d) Balancing of Queue Resources

In the storage system 100, the assignment number-determining unit 12 periodically balances the queue resources. A technique for balancing the queue resources by the assignment number-determining unit 12 will be described below.

The assignment number-determining unit 12 balances the queue resources in a QRB unit in the background with concurrent execution of commands such as an I/O command.

For example, the assignment number-determining unit 12 releases all queue resources of a command-sending/receiving pair receiving "0" commands per unit time to the free pool FP with reference to the implementation information 21 in order to balance the queue resources.

Specifically, the assignment number-determining unit 12 sets the assigned QRB number of a command-sending/receiving pair receiving "0" commands per unit time to "0" and adds the assigned QRB number before the setting to "0" to the number of unassigned QRBs in the free pool FP to release the queue resources to the free pool FP.

The assignment number-determining unit 12 acquires redundant QRBs from the command-sending/receiving pair having redundant QRBs to release the acquired redundant QRBs to the free pool FP.

Figure 8:
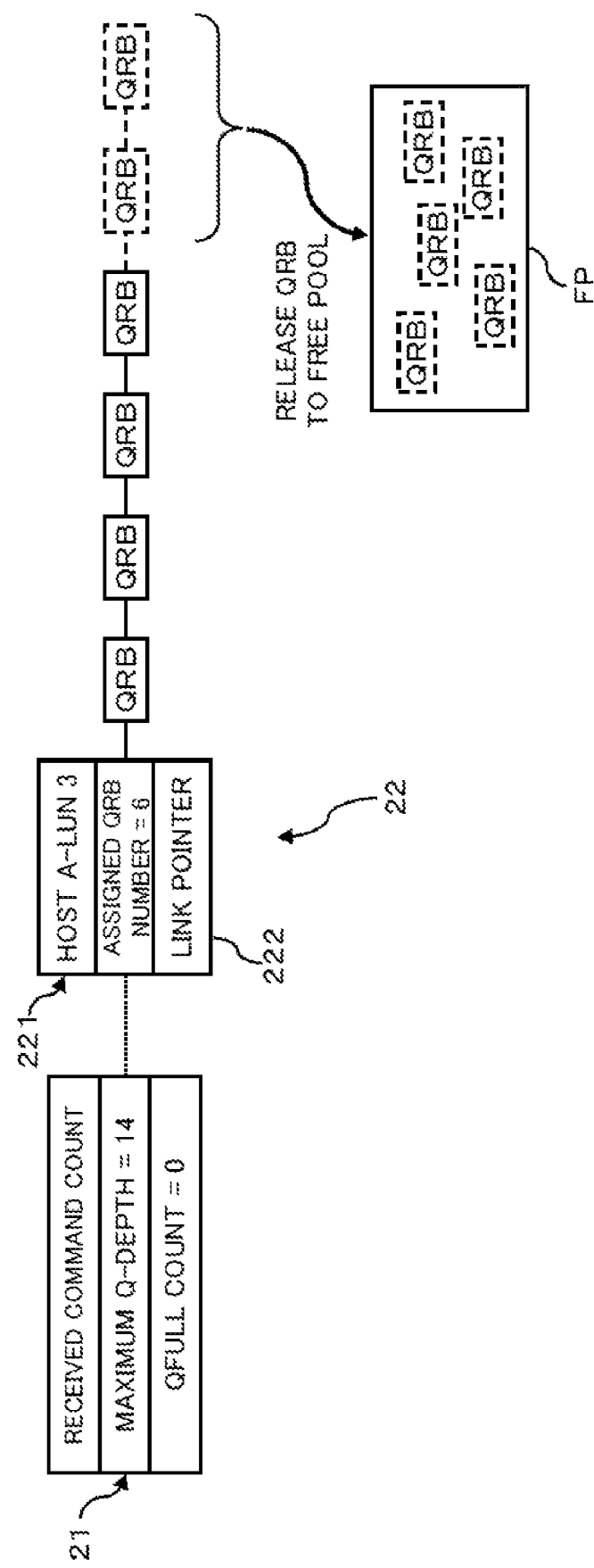
FIG. 8 illustrates a technique for balancing the queue resources by the assignment number-determining unit in the storage system in accordance with an embodiment of the present invention.

FIG. 8 illustrates a technique for balancing the queue resources by the assignment number-determining unit 12 in the storage system 100 in accordance with an embodiment of the present invention, the technique releasing redundant QRBs to the free pool FP.

The assignment number-determining unit 12 releases redundant QRBs (redundant queue resources) in command-sending/receiving pairs such that {[the number of assigned queues((assigned QRB number)×(QRB configuration number (k=4 in this embodiment)))]−(maximum queue-depth)}) }(redundant queue resource number) is equal to or more than the QRB configuration number to the free pool FP.

For example, in the embodiment illustrated in FIG. 8, the redundant queue resource number of the command-sending/receiving pair [HOST A-LUN3] is derived from the following expression:

(Redundant queue resource number)=(the number of assigned queues)[(assigned QRB number)×(QRB configuration number (4 in this embodiment))]−(maximum queue-depth)=6×4−14=10

Since the redundant queue resource number "10" of the command-sending/receiving pair [HOST A-LUN3] is more than four, the assignment number-determining unit 12 releases 2QRB [(redundant QRB number)=2] included in the redundant queue resource number to the free pool FP.

The assignment number-determining unit 12 resets all LUNs in which the QFULL response occurs to equalized queue resource numbers including queue resources in the free pool FP in, for example, an initial stage in which different assigned QRB numbers are assigned to the respective LUNs (command-sending/receiving pairs) in order to balance the queue resources.

Figure 9:
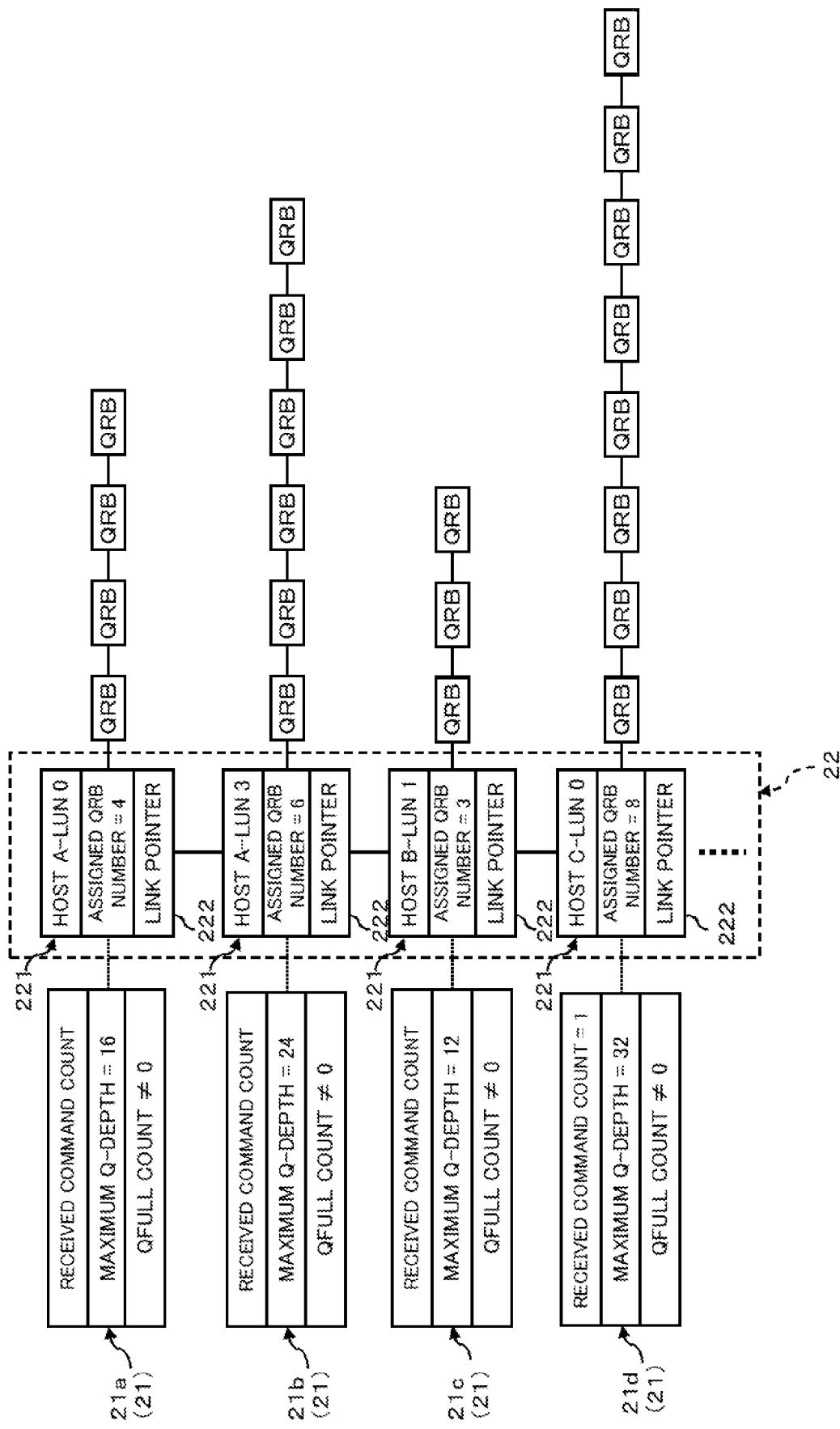
FIG. 9 illustrates a technique for balancing the queue resources by the assignment number-determining unit in the storage system in accordance with an embodiment of the present invention.

FIG. 9 illustrates a technique for balancing the queue resources by the assignment number-determining unit 12 in the storage system 100 in accordance with an embodiment of the present invention, the technique equally distributing queue resource numbers among command-sending/receiving pairs.

In the embodiment illustrated in FIG. 9, in each of the command-sending/receiving pairs [HOST A-LUN0], [HOST A-LUN3] [HOST B-LUN1] and [HOST C-LUN0], at least one QFULL response occurs (QFULL≠0), the assigned QRB numbers 4, 6, 3, and 8 are set to the respective command-sending/receiving pairs.

Therefore, the total number 21 of the QRBs are assigned to the command-sending/receiving pairs receiving the QFULL response.

When, for example, nine unassigned QRBs (9QRB) exist in the free pool FP in this case, 30 QRBs (30QRB) exist in four command-sending/receiving pairs in total. In this case, the assignment number-determining unit 12 equally distributes (divides) this 30QRB to four command-sending/receiving pairs to assign 7QRB to each command-sending/receiving pair.

Similarly, when 20 unassigned QRBs (20QRB) exist in the free pool FP, 41 QRBs (41QRB) exist in four command-sending/receiving pairs in total. In this case, the assignment number-determining unit 12 equally distributes this 41QRB to four command-sending/receiving pairs to assign 10QRB to each command-sending/receiving pair.

The assignment number-determining unit 12 can also set a limit (maximum increased queue number) for an increased number of an assigned QRB number in one periodical queue-balancing, in other words, the increased number of the assigned QRB number before and after the queue-balancing.

For example, when 50 unassigned QRBs (50QRB) exist in the free pool FP in the embodiment illustrated in FIG. 9, 71 QRBs (71QRB) exist in four command-sending/receiving pairs in total. If this 71QRB is equally distributed to four command-sending/receiving pairs, the assigned number 17 will be set for each command-sending/receiving pair. However, when the maximum increased queue number in one periodical queue-balancing is set at, for example, "8" the assigned QRB number of the command-sending/receiving pair [HOST B-LUN1] is equal to "3" before the queue-balancing. Therefore, the maximum assigned QRB number assignable to the command-sending/receiving pair [HOST B-LUN1] is equal to (limited to) "11" (=3+8).

In such queue-balancing, residual QRBs are set in the free pool FP.

These techniques are particularly suitable for balancing of queue resources in, for example, an initial stage such that different assigned QRB numbers are assigned to the respective LUNs (command-sending/receiving pairs).

The assignment number-determining unit 12 may also determine the distribution ratio of the queue resources based on the load ratio (the count of received I/O commands) or the QFULL rate [(QFULL count)/(the count of received commands)]. This technique is suitable for, for example, a stage in which the I/O commands of the respective LUNs (command-sending/receiving pairs) are stable.

In the storage system 100, the assignment number-determining unit 12 may adjust the number of the queue resources to be assigned to a command-sending/receiving pair based on the current assigned QRB number and the QFULL rate as parameters.

Furthermore, for example, when a user sets a schedule such as a time of another job for the storage (for example, backup during night) in the storage system 100, the rate of use of the LUNs is expected to totally change before and after the time (set time for the job).

In this case, it is effective that more queue resources are released to the free pool FP before the other job starts to prepare new commands. Specifically, the assignment number-determining unit 12 may adjust the number of entire queue numbers so as to release a predetermined ratio (for example, one fourth) of the entire queue resources based on queue-balancing immediately before the set time for the job to the free pool FP.

A weight (W) of requirement of addition of resources for every LUN (command-sending/receiving pair) may be calculated by, for example, the following expression (1), and be compared for every LUN to adjust the assigned QRB number. For example, the assigned QRB number is increased for a command-sending/receiving pair (LUN) having a large calculated weight (W).

$$(\text{Weight})(W) = (\text{assigned QRB number}) / [1 - n \times (\text{QFULL rate})] \quad (1)$$

where n is a QFULL coefficient, and is any value (for example, approximately 0.5). The QFULL coefficient (n) is exemplarily equal to 0.5 in this embodiment.

The weight (W) calculated as described above may be compared for every LUN (command-sending/receiving pair) to adjust the assigned QRB number.

Figure 10:
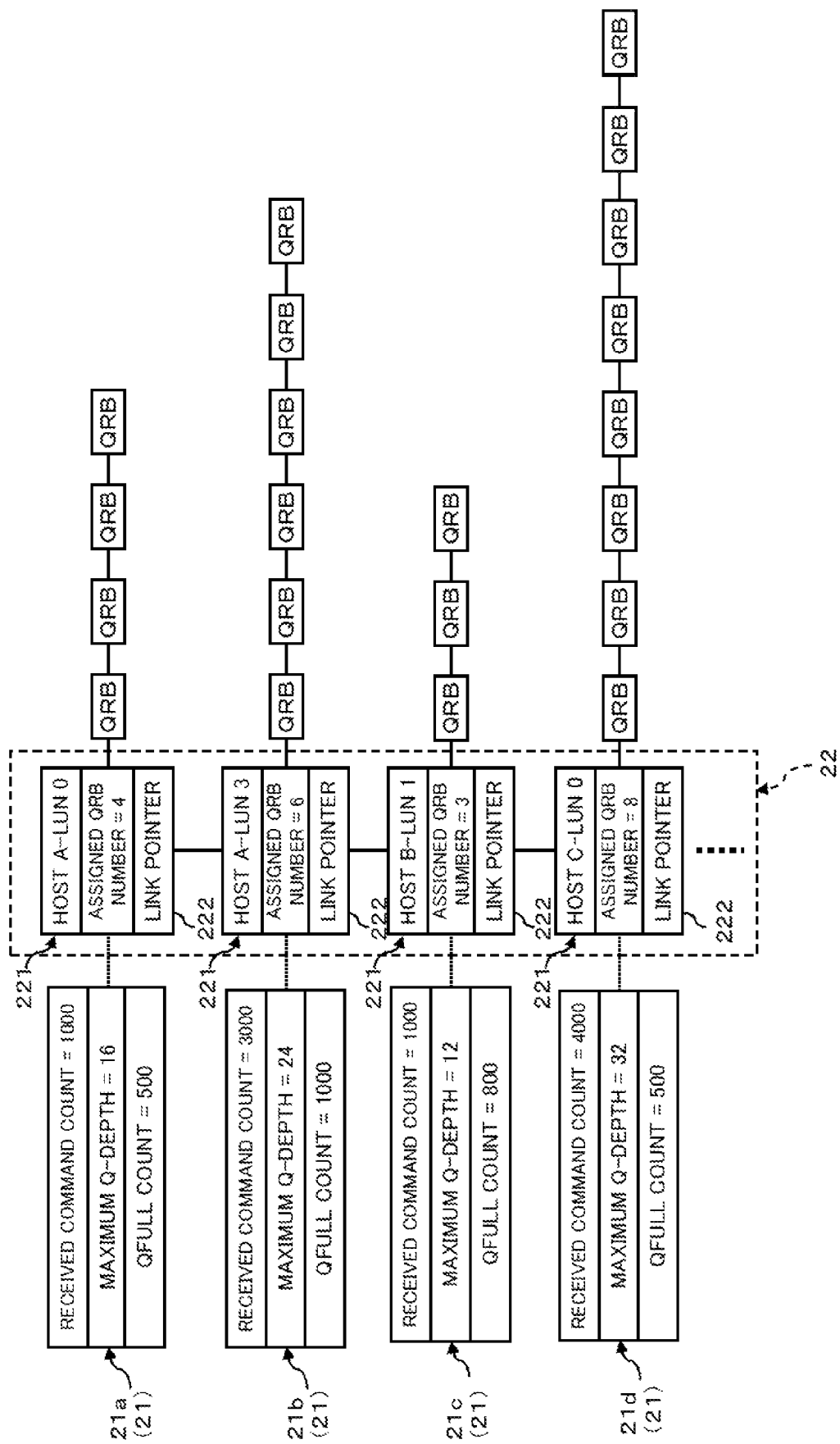
FIG. 10 illustrates a technique for balancing the queue resources by the assignment number-determining unit in the storage system in accordance with an embodiment of the present invention.
Figure 11:
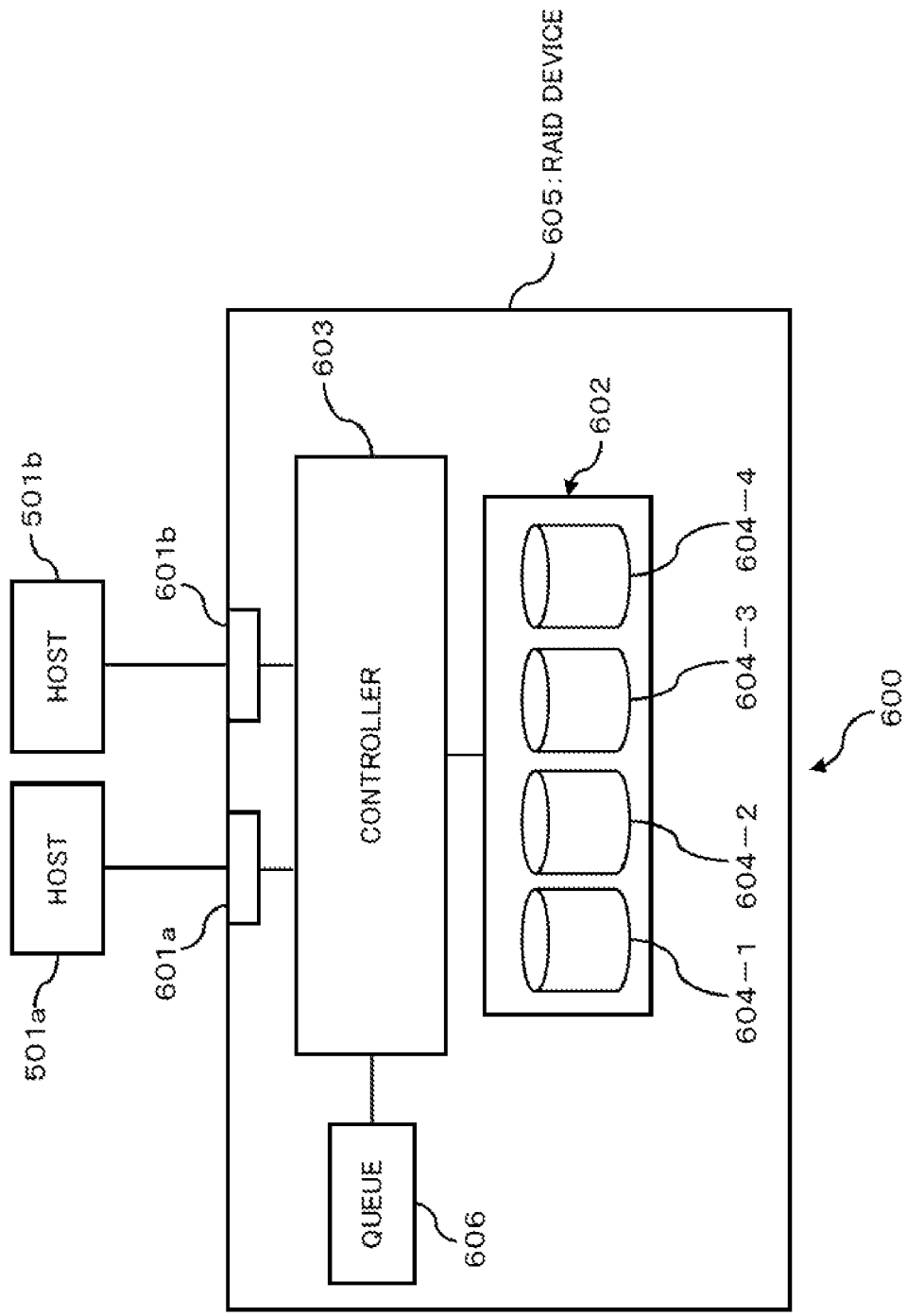
FIG. 11 is a schematic diagram illustrating a typical configuration of a conventional virtualized storage system.
Figures 12A, 12B, 12C:
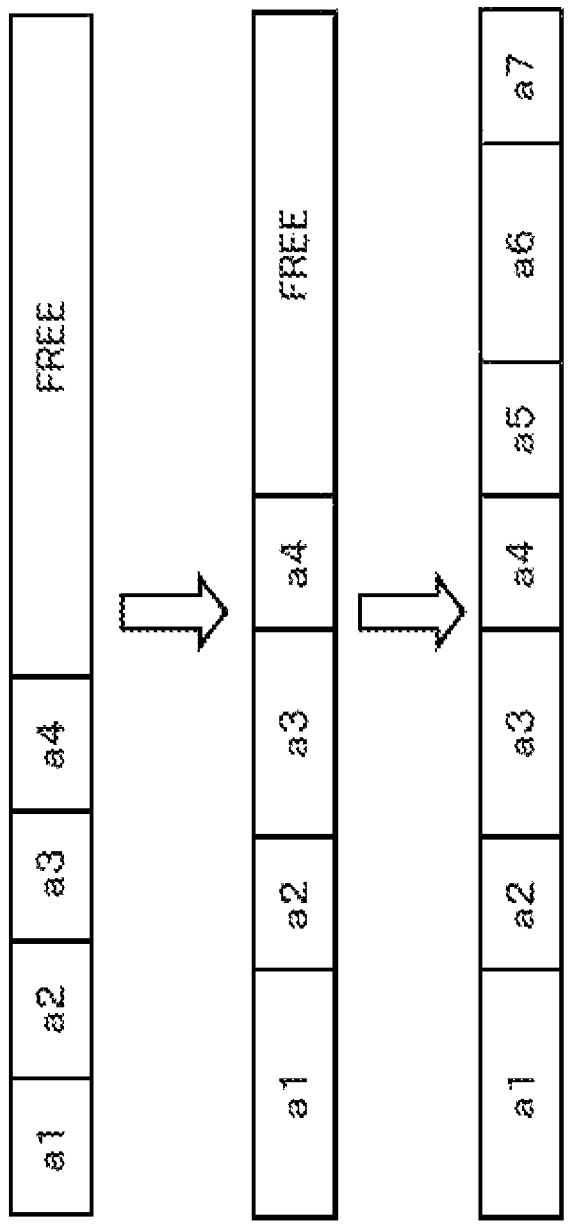
FIGS. 12(*a*) to 12(*c*) illustrate a technique for adjusting the logical sizes of queues in the conventional virtualized storage system.

FIG. 10 illustrates a technique for balancing the queue resources by the assignment number-determining unit 12 in the storage system 100 in accordance with an embodiment of the present invention, the technique balancing the queue resources based on the weights.

In the embodiment illustrated in FIG. 10, for example, the QRB assigned to the command-sending/receiving pair [HOST A-LUN0] is equal to "4" [(assigned QRB=4)], the count of the received commands to "1000", the maximum queue-depth to "16", and the QFULL count to "500" (see the implementation information 21a).

Therefore, the weight of the command-sending/receiving pair [HOST A-LUN0] (W: HOST A-LUN0) is calculated as follows:

HOST A-LUN0: (weight)(W)=4/(1−0.5×500/1000)
 =5.33

Similarly, the weight of each of the other command-sending/receiving pairs [HOST A-LUN3], [HOST B-LUN1], and [HOST C-LUN0] is calculated as follows:

HOST A-LUN0: (weight)(W)=4/(1−0.5×1000/3000)
 =7.20

HOST B-LUN1: (weight)(W)=4/(1−0.5×800/1000)
 =5.00

HOST C-LUN0: (weight)(W)=4/(1−0.5×500/4000)
 =8.53

Now, in order to compare the weight (W) calculated as described above for every LUN (command-sending/receiving pair) to adjust the assigned QRB number, for example, the assigned QRB number may be calculated by the following expression (2) for the balancing.

$$(\text{New QRB number}) = (\text{entire QRB number}) \times (\text{weight}) / (\text{the sum of weights}) \quad (2)$$

For example, in the embodiment illustrated in FIG. 10, if nine unassigned QRBs exist in the free pool FP, 30 QRBs exist in total since the total number of the QRBs of the command-sending/receiving pairs at a QFULL count≠0 is equal to 21.

In this case, the assigned QRB number of each command-sending/receiving pair may be calculated by the expression (2) after the balancing as follows:

HOST A-LUN0: (assigned QRB number)=30×5.33/
 26.06=6.14≈6

HOST A-LUN3: (assigned QRB number)=30×7.20/
 26.06=8.29≈8

HOST B-LUN1: (assigned QRB number)=30×5.00/
 26.06=5.76≈5

HOST C-LUN0: (assigned QRB number)=30×8.53/
 26.06=9.82≈9

If no unassigned QRB exists in the free pool FP, 21 QRBs exist in total. In this case, the assigned QRB number of each command-sending/receiving pair may be calculated after the balancing as follows:

HOST A-LUN0: (assigned QRB number)=21×5.33/
 26.06=4.30≈4

HOST A-LUN3: (assigned QRB number)=21×7.20/
 26.06=5.80≈5

HOST B-LUN1: (assigned QRB number)=21×5.00/
 26.06=4.03≈4

HOST C-LUN0: (assigned QRB number)=21×8.53/
 26.06=6.83≈6

In this embodiment, the assigned QRB number is determined by truncating its decimal part as a matter of convenience. However, this embodiment is not restricted to such truncation. For example, round-off may be used if the total number of the QRBs is sufficient. Various modifications may be made to the embodiment without departing from the spirit of the present invention.

The assigned QRB number may also be determined based on, for example, the average response time period of each command-sending/receiving pair (LUN). Various modifications may be made to the embodiment without departing from the spirit of the present invention.

As described above, the storage system 100 in accordance with an embodiment of the present invention can properly balance the number of the executed I/O commands among the command-sending/receiving pairs (LUNs), and efficiently process the I/O commands. At this time, the queue resources can be efficiently used in consideration of a limit of the queue resources.

Since the assignment number-determining unit 12 determines the assigned QRB number for a target command-sending/receiving pair based on the implementation information 21, queue resources can be assigned to the target command-sending/receiving pair according to actual status of use of the RAID device 60.

Since the storage system 100 manages the number of the queue resources to be assigned in a QRB unit (QRB configuration number), the load of a process for assigning queue resources to a target command-sending/receiving pair can be reduced to speed up the process.

For example, a QRB configuration number can be increased to decrease the number of the QRBS, thereby reducing the overhead to speed up, for example, a balancing process and a searching process through a link of QRBs. Alternatively, a QRB configuration number can be decreased to process the subtle balancing.

The number of queue resources to be assigned can also be managed in a QRB unit to simplify calculation of the weight (W), thereby reducing the balancing process.

Since the above-described queue assigning process is executed while an accessing process from the host 1 is executed in operation of the storage system 100, the balancing process can be reduced as described above to reduce the load for the accessing process and to speed up this process.

The assignment number-determining unit 12 sets the initially assigned number of QRBs for a target command-sending/receiving pair in the case of a first process for an I/O command to ensure the process for the I/O command.

When the initially assigned number of QRBs to be assigned to a target command-sending/receiving pair cannot be acquired from the free pool FP, redundant QRBs are acquired from other command-sending/receiving pairs to be assigned to the target command-sending/receiving pair. Therefore, the I/O command in the target command-sending/receiving pair can be surely processed.

In this case, since the number of QRBs sufficing the number of queue resources corresponding to the maximum queue-depth is still assigned to these command-sending/receiving pairs providing the redundant QRBs, the QFULL response is unlikely to occur in the command-sending/receiving pairs. This does not speed down processes in the storage system 100, and can maintain its high reliability.

Furthermore, the assignment number-determining unit 12 acquires redundant QRBs in sequence by, for example, a round-robin technique from command-sending/receiving pairs such that {[the number of assigned queues((assigned QRB number)×(QRB configuration number (k=4 in this embodiment)))]−(maximum queue-depth)}(redundant queue resource number) is equal to or more than the QRB configuration number, thereby assigning the QRBs sufficing the initially assigned number to a command-sending/receiving pair such that unassigned QRBs in the free pool FP cannot suffice its initially assigned number. This can efficiently assign the QRBs.

In the case of neither unassigned QRBs in the free pool FP nor redundant QRBs that cannot be acquired from another command-sending/receiving pair for determination of the assigned QRB number, the assignment number-determining unit 12 acquires one QRB from a command-sending/receiving pair having an assigned QRB number equal to or more than "2" among other command-sending/receiving pairs in which any QFULL events do not occur {(QFULL count)=0} in a predetermined period with reference to the implementation information 21 to assign the acquired QRB to the target command-sending/receiving pair. Thereby, the QRB configuration number k of the queue resources is assigned to the target command-sending/receiving pair, which enables processes for at least k I/O commands. This can ensure the minimum processes for the I/O commands.

Furthermore, since the assignment number-determining unit 12 periodically balances queue resources for QRBs assigned to the command-sending/receiving pairs, the queue resources can be efficiently used due to, for example, no assignment of many queue resources to command-sending/receiving pairs having a low process frequency (light load). In addition, occurrence of QFULL responses can be reduced to efficiently process the I/O commands.

A weight (W) of requirement for addition of resources for every command-sending/receiving pair (LUN) can be calculated according to the implementation information 21 (for example, QFULL rate) to adjust the assigned QRB number by this weight (W), thereby enabling assignment of the queue resources suitable to operational status of the RAID device 60.

The present invention is not restricted to the above-described embodiments. Various modifications may be made to the embodiments without departing from the spirit of the present invention.

For example, since the memory unit is not restricted to a HDD (Hard disk drive), an optical disk drive, a semiconductor storage device, or any other storage devices can be used. Various modifications may be made to the embodiments without departing from the spirit of the present invention.

Disclosure of each embodiments of the present invention enables those skilled in the art to implement and manufacture.

The disclosed device has advantages that the number of data input/output-requiring commands executed among the command-sending/receiving pairs can be properly balanced to efficiently process the data input/output-requiring commands.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A storage device that is communicatively connected to external devices, and provides at least one logical device for each of the external devices, the storage device comprising:
   a memory which is divided into a plurality of command-processing resources, each command-processing resource being allocated for storing a data input or output request command for the logical device from each of the external devices;

an allocation count managing unit that manages, for a command-sending/receiving pair comprising an external device which is the sender of the input or output request command and a corresponding logical device to which the data input or output request command is to be sent, the number of the command-processing resources to be allocated to that command-sending/receiving pair;

an allocation control unit that, in response to receiving the data input or output request command from the external device, allocates at least one command-processing resource to a command-sending/receiving pair comprising that external device and a corresponding logical device to which the data input or output request command is to be sent, the number of the at least one command-processing resource not exceeding the number to be assigned that is managed by the allocation count managing unit, and stores the data input or output request command in the at least one command-processing resource;

an execution information-managing unit that manages the number of the data input or output request commands concurrently processed per unit time corresponding to each of the command-sending/receiving pairs as execution information, and an allocation count determining unit that determines the number of the command-processing resources to be allocated to the command-sending/receiving pair based on the execution information, the allocation count determining unit setting a predetermined number to be allocated to at least two of the command-sending/receiving pairs for setting the storage, the number being equal for each of the pairs, wherein the number of the command-processing resources for a communication port connected to each of the external devices is predetermined as a finite number, and in the case there is an allocated command-sending/receiving pair to which the predetermined number to be allocated cannot be set due to a lack of the command-processing resources, the allocation count determining unit decreases the number to be allocated to another command-sending/receiving pair to which the allocated number is set such that the number to be allocated to the other pair exceeds the number of the data input or output request commands processed per unit time, and increases the number to be allocated to the allocated command-sending/receiving pair by the decreased number.

2. The storage device according to claim 1, wherein the allocation count determining unit periodically determines the number of the command-processing resource to be allocated to the command-sending/receiving pair.

3. The storage device according to claim 2, wherein the execution information-managing unit manages the count of the commands received from the external device per unit time as the execution information, and the allocation count determining unit sets the number to be allocated to the command-sending/receiving pair having no command received from the external device per unit time to zero.

4. The storage device according to claim 2, wherein the allocation count determining unit determines the number obtained by adding a predetermined number to the count of the input or output request commands processed per unit time corresponding to the command-sending/receiving pair as the number to be allocated to the command-sending/receiving pair.

5. The storage device according to claim 2, wherein in a QFULL condition in which no more command-processing resource available for allocating to an additional data input or output request command newly received from the external device, the allocation count determining unit sets a predetermined number to be allocated to each of the command-sending/receiving pairs for the logical devices in the QFULL condition, the predetermined number being equal for each of the pairs.

6. The storage device according to claim 1, wherein the allocation count managing unit manages the number to be allocated in a block unit including the at least two command-processing resources.

7. A controller for a storage device that is communicatively connected to external devices, and provides at least one logical device for each of the external devices, the controller comprising:

a memory which is divided into a plurality of command-processing resources, each command-processing resource being allocated for storing a data input or output request command for the logical device from each of the external devices;

an allocation count managing unit that manages, for a command-sending/receiving pair comprising an external device which is the sender of the input or output request command and a corresponding logical device to which the data input or output request command is to be sent, the number of the command-processing resources to be allocated to that command-sending/receiving pair;

an allocation control unit that, in response to receiving the data input or output request command from the external device, allocates at least one command-processing resource to a command-sending/receiving pair comprising that external device and a corresponding logical device to which the data input or output request command is to be sent, the number of the at least one command-processing resource not exceeding the number to be assigned that is managed by the allocation count managing unit, and stores the data input or output request command in the at least one command-processing resource;

an execution information-managing unit that manages the number of the data input or output request commands processed per unit time corresponding to each of the command-sending/receiving pairs as execution information, and an allocation count determining unit that determines the number of the command-processing resources to be allocated to the command-sending/receiving pair based on the execution information, the allocation count determining unit setting a predetermined number to be allocated to at least two of the command-sending/receiving pairs for setting the storage, the number being equal for each of the pairs, wherein the number of the command-processing resources for a communication port connected to each of the external devices is predetermined as a finite number, and in the case there is an allocated command-sending/receiving pair to which the predetermined number to be allocated cannot be set due to a lack of the command-processing resources, the allocation count determining unit decreases the number to be allocated to another command-sending/receiving pair to which the allocated number is set such that the number to be allocated to the other pair exceeds the number of the data input or output request commands processed per unit time, and increases the number to be allocated to the allocated command-sending/receiving pair by the decreased number.

8. The controller according to claim 7, wherein the allocation count determining unit periodically determines the number of the command-processing resource to be allocated to the command-sending/receiving pair.

9. The controller according to claim 8, wherein the execution information-managing unit manages the count of the commands received from the external device per unit time as the execution information, and the allocation count determining unit sets the number to be allocated to the command-sending/receiving pair having no command received from the external device per unit time to zero.

10. The controller according to claim 8, wherein the allocation count determining unit determines the number obtained by adding a predetermined number to the count of the data input or output request commands processed per unit time corresponding to the command-sending/receiving pair as the number to be allocated to the command-sending/receiving pair.

11. The controller according to claim 8, wherein in a QFULL condition in which no more command-processing resource available for allocating to an additional data input or output request command newly received from the external device, the allocation count determining unit sets a predetermined number to be allocated to each of the command-sending/receiving pairs for the logical devices in the QFULL condition, the predetermined number being equal for each of the pairs.

12. The controller according to claim 7, wherein the allocation count-managing unit manages the number to be allocated in a block unit including the at least two command-processing resources.

* * * * *